(12) United States Patent
Emori et al.

(10) Patent No.: US 10,396,832 B2
(45) Date of Patent: Aug. 27, 2019

(54) FILLING APPARATUS

(71) Applicant: TATSUNO CORPORATION, Tokyo (JP)

(72) Inventors: Ichi Emori, Tokyo (JP); Hiroshi Okawa, Tokyo (JP); Takayuki Fuse, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 0 days.

(21) Appl. No.: 16/010,252

(22) Filed: Jun. 15, 2018

(65) Prior Publication Data

US 2018/0375536 A1  Dec. 27, 2018

(30) Foreign Application Priority Data

Jun. 21, 2017  (JP) ................................ 2017-121136

(51) Int. Cl.
| | |
|---|---|
| *H04B 1/08* | (2006.01) |
| *H04B 10/60* | (2013.01) |
| *H04B 1/38* | (2015.01) |
| *F17C 5/06* | (2006.01) |
| *B60K 15/01* | (2006.01) |
| *H04B 1/02* | (2006.01) |
| *F17C 5/00* | (2006.01) |
| *B60L 53/18* | (2019.01) |
| *B60L 53/68* | (2019.01) |
| *F17C 13/02* | (2006.01) |
| *B60L 58/30* | (2019.01) |

(52) U.S. Cl.
CPC ............... *H04B 1/02* (2013.01); *B60L 53/18* (2019.02); *B60L 53/68* (2019.02); *F17C 5/007* (2013.01); *B60L 58/30* (2019.02); *F17C 13/025* (2013.01); *F17C 13/026* (2013.01); *F17C 13/028* (2013.01); *F17C 2205/0364* (2013.01); *F17C 2205/0376* (2013.01); *F17C 2221/012* (2013.01); *F17C 2223/0123* (2013.01); *F17C 2223/036* (2013.01); *F17C 2250/034* (2013.01); *F17C 2260/042* (2013.01); *F17C 2270/0139* (2013.01); *F17C 2270/0168* (2013.01)

(58) Field of Classification Search
CPC ........ H04B 1/38; H04B 1/3822; H04B 10/00; H04B 1/08; H04B 10/60; F17C 5/002; F17C 5/06; F17C 5/00; B60K 15/00; B60K 15/01
See application file for complete search history.

(56) References Cited

U.S. PATENT DOCUMENTS

| 8,924,037 | B2* | 12/2014 | Seymour | ................ | B67D 7/145 |
| | | | | | 701/1 |
| 8,973,623 | B2* | 3/2015 | Mori | ...................... | F17C 5/007 |
| | | | | | 141/197 |
| 9,604,535 | B2* | 3/2017 | Yahashi | ............... | B60K 15/077 |

(Continued)

*Primary Examiner* — Blane J Jackson
(74) *Attorney, Agent, or Firm* — Stetina Brunda Garred and Brucker; Mark E. Garred

(57) ABSTRACT

To provide a filling apparatus capable of eliminating a disadvantage caused by a cable connecting a photodetector to a receiver. A filling apparatus 100 according to the present invention includes a radio transmission section 10 with a function of transmitting vehicle information via radio transmission on a filling nozzle 50. In the filling apparatus 100, it is preferable that the radio transmission section 10 is detachably attached to the end portion 50A of the filling nozzle 50.

12 Claims, 8 Drawing Sheets

(56) References Cited

U.S. PATENT DOCUMENTS

| | | | | |
|---|---|---|---|---|
| 9,735,439 B2* | 8/2017 | Kawaura | ............ | H01M 8/04201 |
| 2010/0261430 A1* | 10/2010 | Parias | ................... | F17C 13/003 |
| | | | | 455/41.2 |
| 2013/0146176 A1* | 6/2013 | Yahashi | .................. | F17C 5/007 |
| | | | | 141/4 |
| 2017/0059089 A1* | 3/2017 | Uchida | ..................... | F17C 5/06 |

* cited by examiner

【Fig. 1】
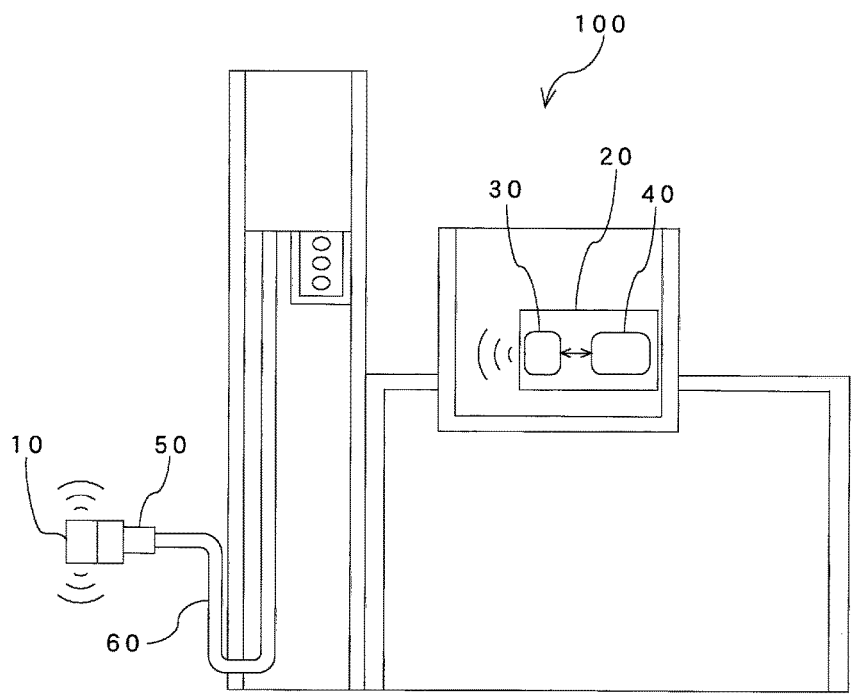
【Fig. 2】
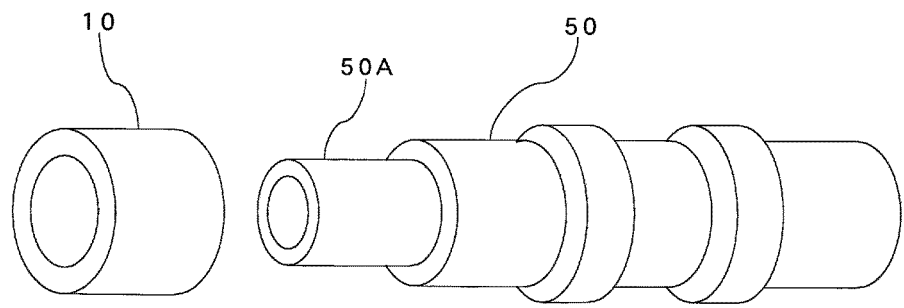

[Fig. 3]
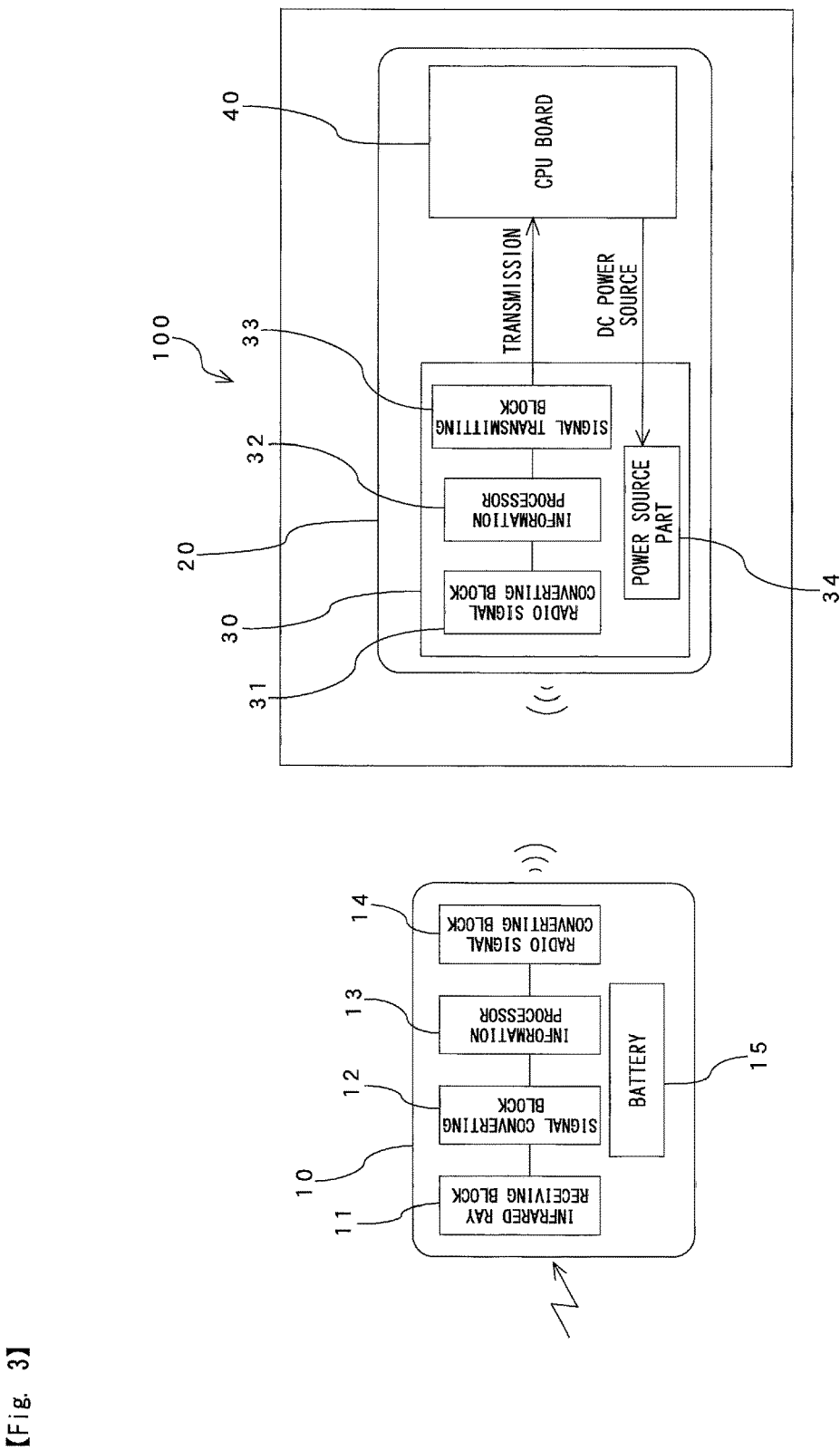

[Fig. 4]
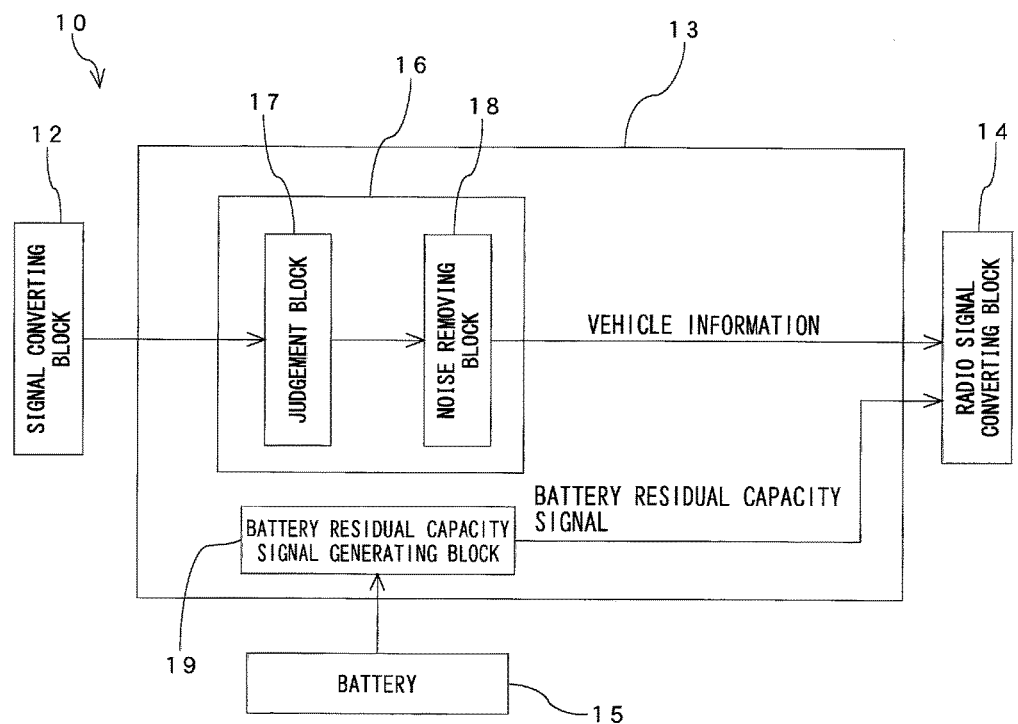
[Fig. 5]
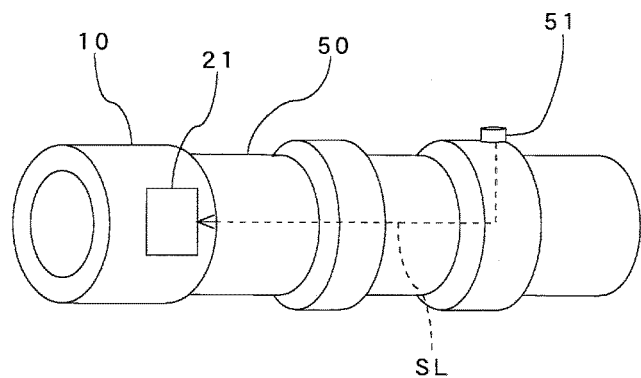

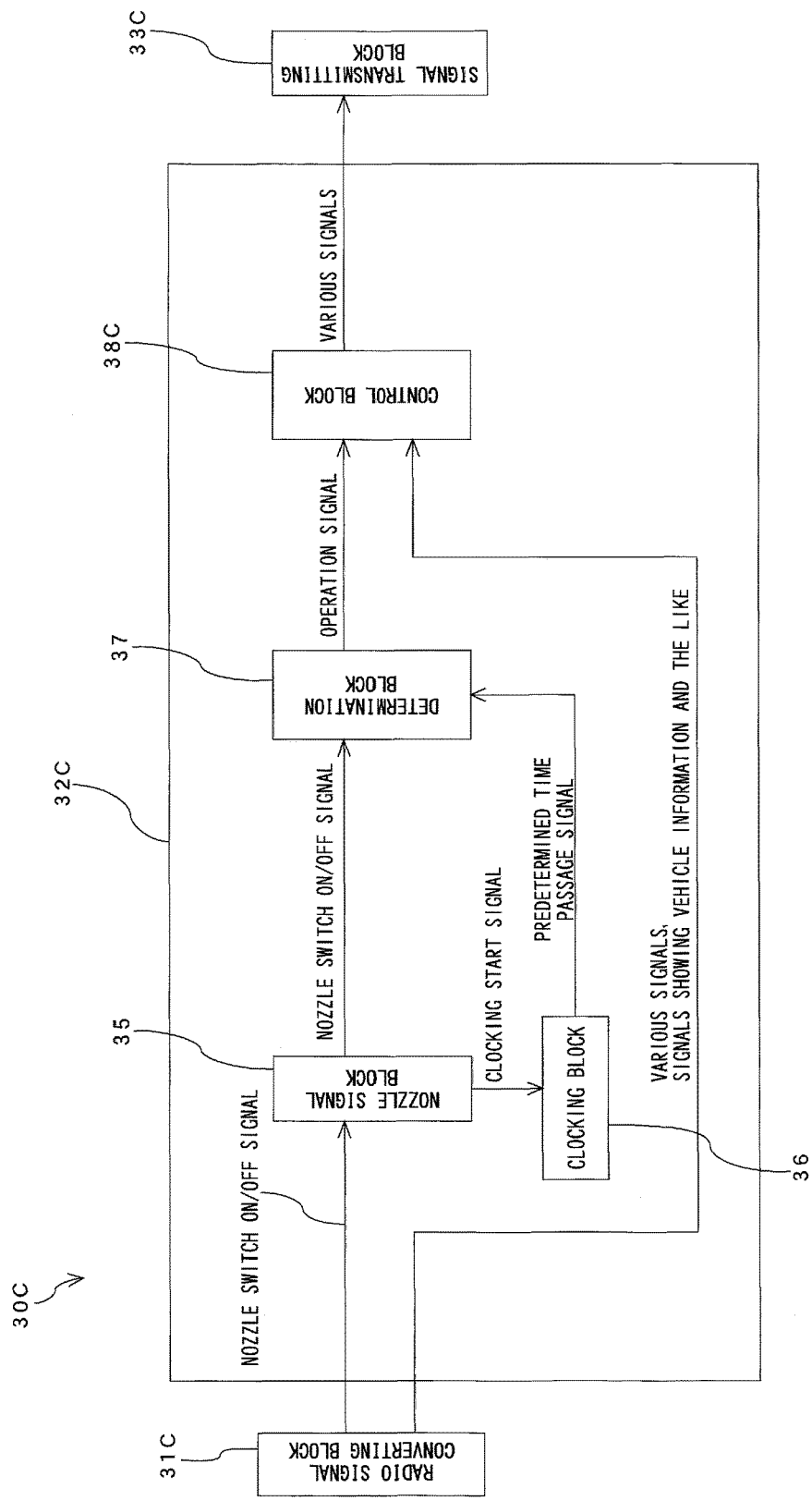
[Fig. 6]

[Fig. 7]
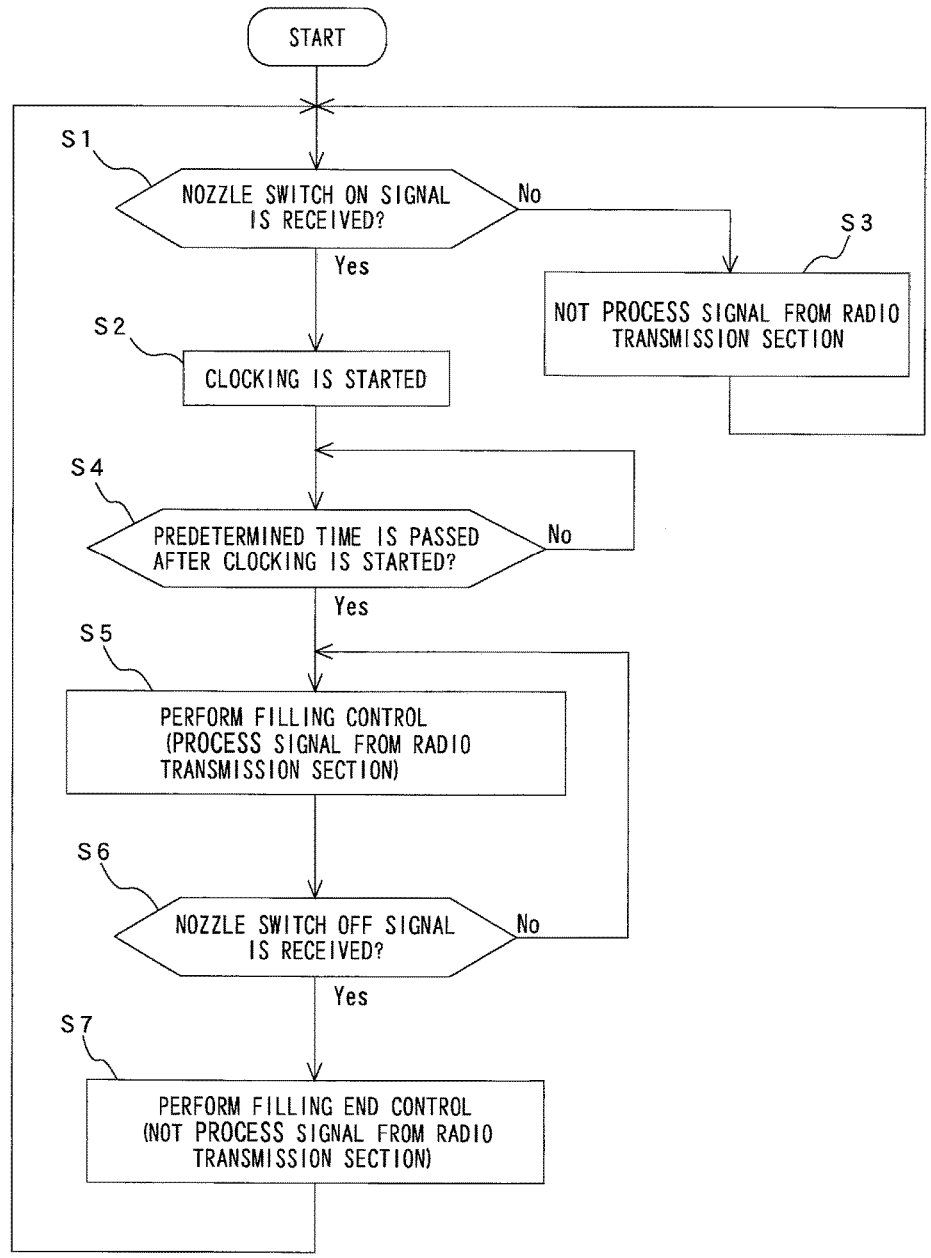

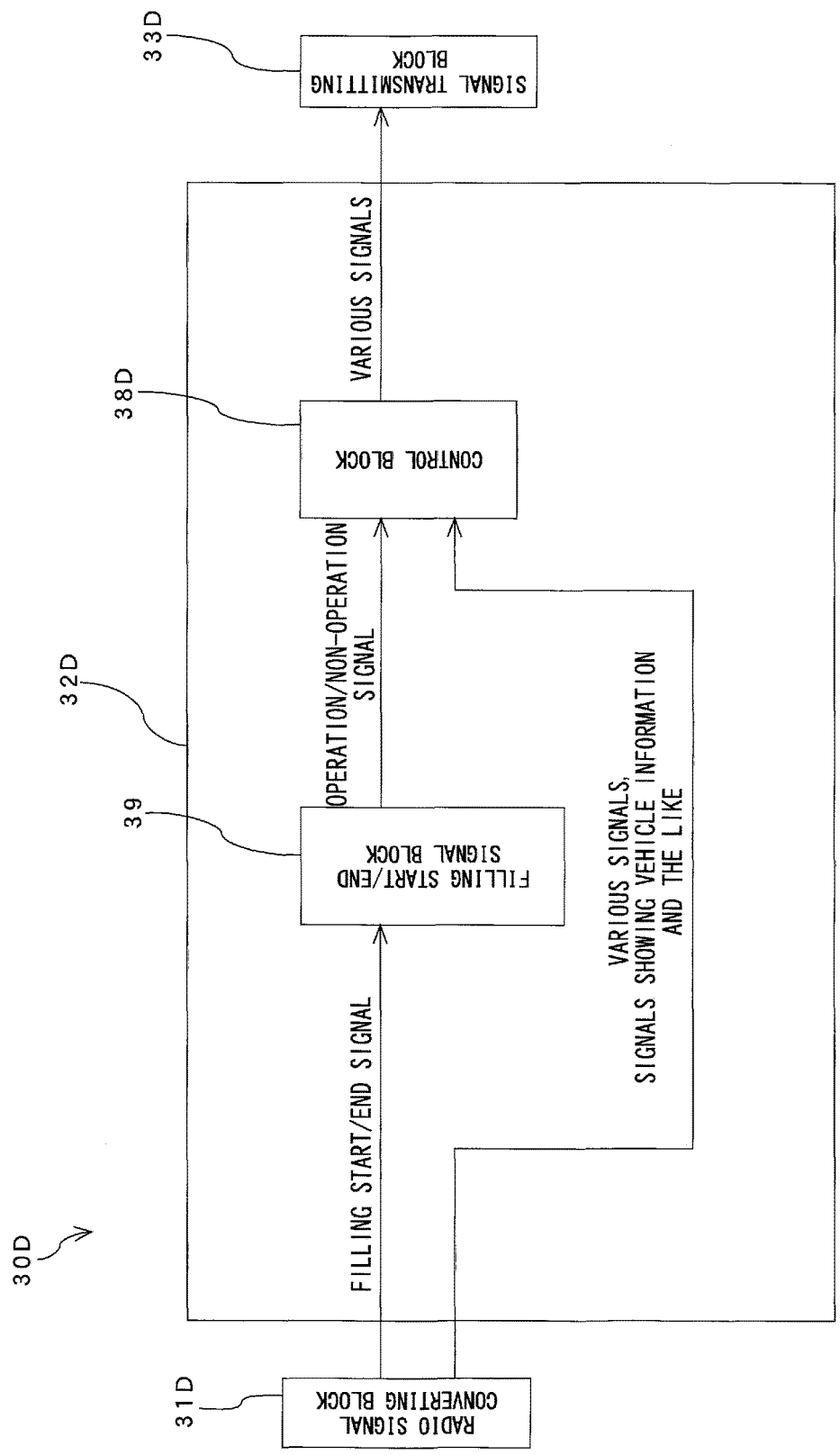
[Fig. 8]

[Fig. 9]
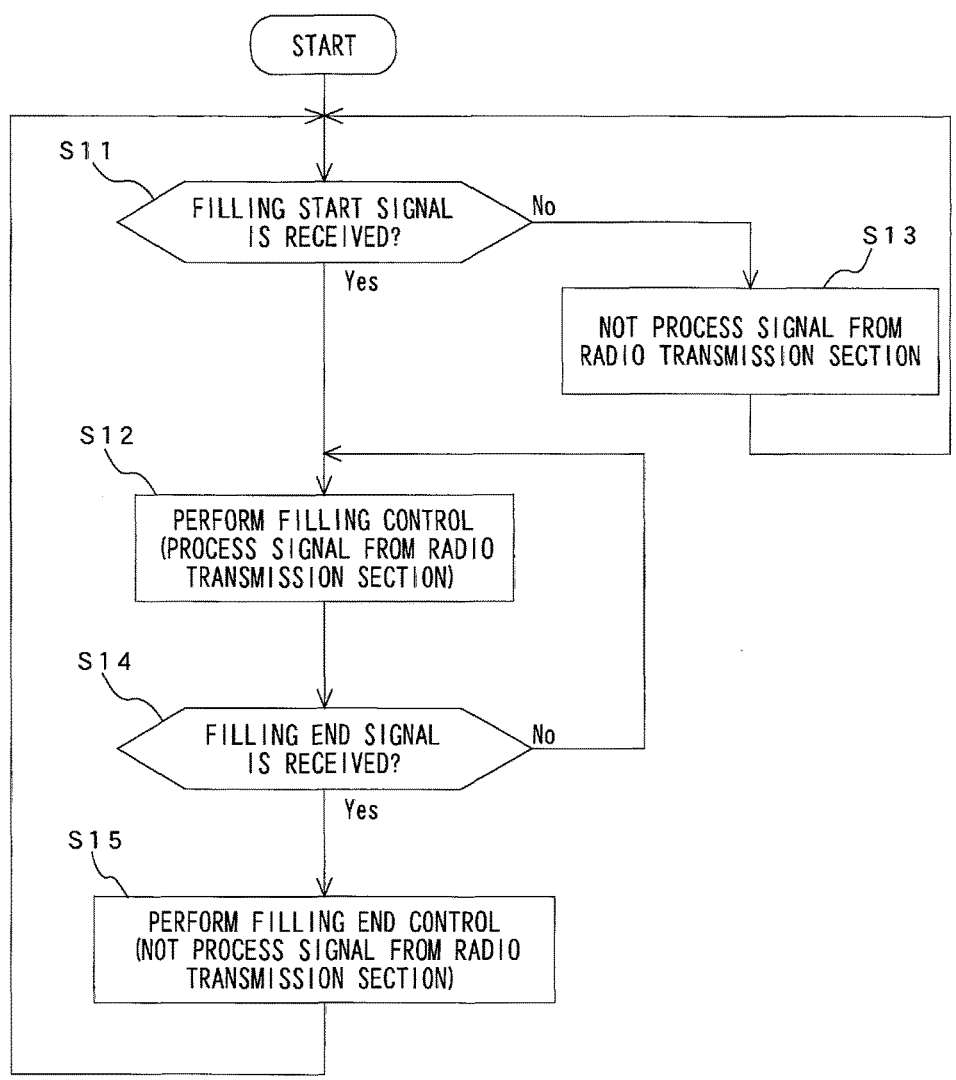

【Fig. 10】
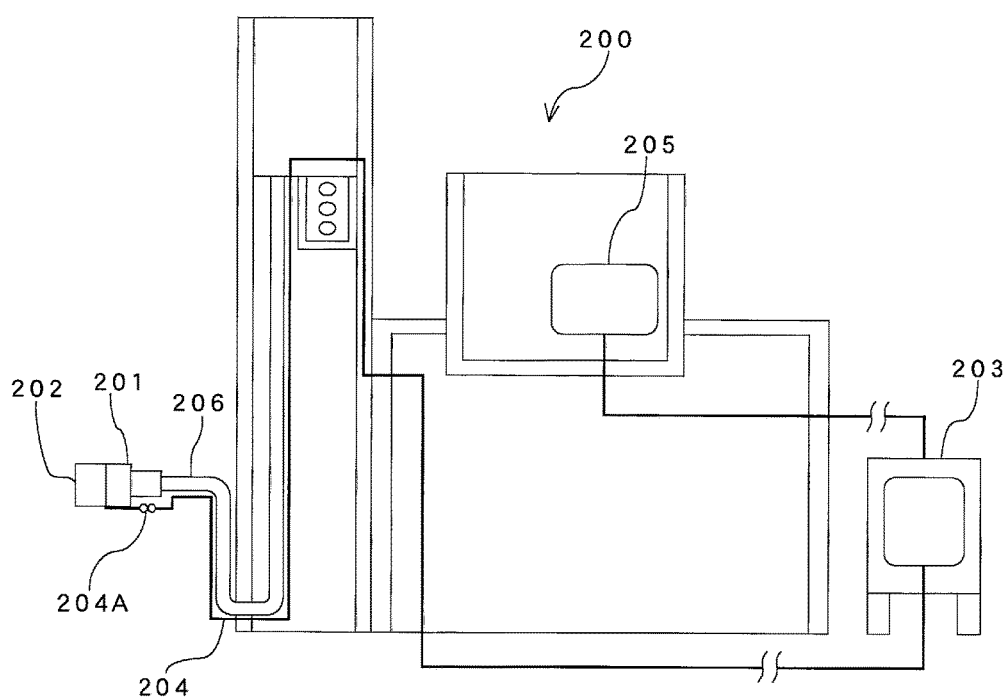

FILLING APPARATUS

CROSS-REFERENCE TO RELATED APPLICATIONS

The present application claims priority to Japanese Patent Application No. 2017-121136 filed on Jun. 21, 2017, the disclosure of which are incorporated herein by reference.

STATEMENT RE: FEDERALLY SPONSORED RESEARCH/DEVELOPMENT

Not Applicable

BACKGROUND

1. Field of the Invention

The present invention relates to a filling apparatus for filling fuel such as hydrogen gas to a vehicle.

2. Description of the Related Art

In a conventional hydrogen filling apparatus 200 shown in FIG. 10, a photodetector 202 equipped onto a filling nozzle 201 receives an optical signal including information such as tank pressure, tank temperature and the like from a communication device of a fuel cell vehicle (Society of Automotive Engineers: SAE-J2799); converts the optical signal into an electric serial communication signal; and transmits the converted signal via a cable 204 to a receiver 203 mounted on a non-dangerous area. The receiver 203 transports the received signal to a controller 205, and the controller 205 processes the signal to control devices of the hydrogen filling apparatus 200.

The cable 204 is mounted not only to transmit signal but also to supply driving power, and is wired from a filling nozzle 201 along a filling hose 206 via an inside of the hydrogen filling apparatus 200 to the receiver 203. Here, a filling work pulls and twists the cable 204, so that a connecter part 204A and the like adjacent to the filling nozzle 201 often breaks. When the cable 204 is disconnected, it becomes impossible to fill gas fuel such as hydrogen. In addition, since the cable 204 is long, the cable 204 is easily affected by electric noise from the hydrogen filling apparatus 200, there is a possibility that the cable 204 cannot concisely transmit signals due to the noise.

As another conventional technique, for example, a hydrogen filling apparatus allowing easy assembly is proposed (refer to Japanese Patent Publication 2015-137671). However, the hydrogen filling apparatus does not intend to solve the above problems.

The content of Japanese Patent Publication 2015-137671 is incorporated herein by reference in its entirety.

BRIEF SUMMARY

The present invention has been made in consideration of the above problems in the prior art, and the object thereof is to provide a filling apparatus capable of eliminating a disadvantage of the cable connecting the photodetector to the receiver.

A filling apparatus 100 of the present invention is characterized by including a radio transmission section (photodetector) 10 with a function of transmitting vehicle information via radio transmission on a filling nozzle 50.

In the filling apparatus 100 described above, it is preferable that the radio transmission section 10 is detachable from an end portion of the filling nozzle 50. And, it is preferable that the radio transmission section 10 has an explosion-proof structure.

In the filling apparatus 100 described above, the radio transmission section 10 preferably incorporates a buttery 15. Further, it is preferable that the radio transmission section 10 incorporates an information processor 13 and the information processor 13 has functions of checking the information of the vehicle with the filling nozzle 50 and transmitting residual capacity of the buttery to the filling apparatus 100.

In the filling apparatus 100 described above, the information processor 13 preferably has a function of not transmitting noise generated from the radio transmission section 10. Or, it is preferable that a switch (automatic switch) 51 for operating/stopping the radio transmission section 10 is mounted on the filling nozzle 50, and the switch 51 has a function of transmitting a signal for operating the radio transmission section 10 when the filling nozzle 50 is attached to the vehicle.

The filling apparatus 100 described above preferably has a controller 20, which has a function of processing a signal transmitted from the radio transmission section 10 only when the controller 20 receives a signal from a nozzle switch that acts when the filling nozzle 50 is taken off a nozzle hook, and a predetermined time passes after the signal is received. Or, it is preferable that to the filling apparatus 100 is mounted the controller 20; a filling start button is mounted on the filling nozzle 50; and the controller 20 has a function of processing a signal transmitted from the radio transmission section 10 only when the controller 20 receives a signal indicating that the filling start button is pressed.

With the present invention, the radio transmission section 10 having a function of transmitting vehicle information via radio transmission is mounted on the filling nozzle 50, so that a communication cable is not needed, and a disadvantage due to disconnection of the cable does not generate. In addition, since the vehicle information is transmitted via a short-distance radio communication, it is not harmfully affected by electric noise. Further, no cable causes repair work to easily be performed when the filling apparatus 100 is damaged or broken.

In the present invention, when the radio transmission section 10 is detachable from an end portion of the filling nozzle 50, it can be detached from the filling nozzle 50 to be repaired easily and surely at breakage and the like. In addition, when the radio transmission section 10 has the explosion-proof structure, safety of the filling apparatus 100 is improved. In the present invention, when the radio transmission section 10 incorporates the buttery 15, it becomes possible to operate without a cable for power supply.

Here, in case that the radio transmission section 10 is always operated by the buttery 15, there is a possibility that a noise such as a bias signal generated by sunshine is transmitted as a signal from the radio transmission section 10 to the controller 20 of the filling apparatus 100. But, in the present invention, when the radio transmission section 10 incorporates the information processor 13, and the information processor 13 has a function of not transmitting the noise generated from the radio transmission section 10, it is prevented that the noise is transmitted to the controller 20 of the filling apparatus 100, so that the controller 20 is not required to process the noise, and load of the controller 20 can be reduced.

Or, when the switch 51 for operating/stopping the radio transmission section 10 is mounted on the filling nozzle 50, and the switch 51 has a function of transmitting a signal for operating the radio transmission section 10 when the filling nozzle 50 is attached to the vehicle, even if sunlight irradiates the radio transmission section 10, the radio transmission section 10 does not operate without filling any fuel, so that it is prevented that the noise is transmitted to the controller 20, and load of the controller 20 can be reduced.

Further, when the filling apparatus 100 according to the present invention has the controller 20, and the controller 20 has a function of processing a signal transmitted from the radio transmission section 10 only when the controller 20 receives a signal from a nozzle switch that acts when the filling nozzle 50 is taken off a nozzle hook, and a predetermined time passes after the signal is received, the controller 20 of the filling apparatus 100 judges that filling is not performed, that is, any kind of fuel is not filled, and the filling apparatus 100 does not process the signal transmitted from the radio transmission section 10 until receiving the signal from the nozzle switch and the predetermined time passes. Therefore, the controller 20 does not process the noise generated when the filling is not performed and so on, and load of the controller 20 can be reduced.

Or, when the filling apparatus 100 according to the present invention has the controller 20; the filling start button is mounted on the filling nozzle 50; and the controller 20 has a function of processing the signal transmitted from the radio transmission section 10 only when the controller 20 receives the signal indicating that the filling start button is pressed, the controller 20 of the filling apparatus 100 does not process signal transmitted from the radio transmission section 10 until the filling start button is pressed. Therefore, the controller 20 does not process a noise generated when the filling is not performed filling start button is pressed, and load of the controller 20 can be reduced.

BRIEF DESCRIPTION OF THE DRAWINGS

FIG. 1 is a schematic view showing a filling apparatus according to the first embodiment of the present invention;

FIG. 2 is an explanatory view showing a condition that the filling nozzle is attached to/detached from a radio transmission section;

FIG. 3 is a block diagram of the radio transmission section and the controller of the filling apparatus;

FIG. 4 is a block diagram showing an information processer of the radio transmission section;

FIG. 5 is a schematic view showing a filling nozzle and a radio transmission section of a filling apparatus according to the second embodiment of the present invention;

FIG. 6 is a block diagram showing a filling apparatus according to the third embodiment of the present invention;

FIG. 7 is a flowchart showing a control in the third embodiment;

FIG. 8 is a block diagram showing a filling apparatus according to the fourth embodiment of the present invention;

FIG. 9 is a flowchart showing a control in the fourth embodiment; and

FIG. 10 is a schematic view showing a conventional filling apparatus.

DETAILED DESCRIPTION

Hereinafter, a filling apparatus for filling hydrogen will be explained as embodiments of the present invention with reference to attached drawings. At first, the filling apparatus according to the first embodiment of the present invention will be explained with reference to FIGS. 1 to 4. In FIG. 1, the filling apparatus 100 has a radio transmission section 10 such as a photodetector, and a controller 20. As shown in FIG. 2, the radio transmission section 10 is detachably attached to an end portion 50A of a filling nozzle 50 mounted to an end portion of a filling hose 60 (refer to FIG. 1), and has a function of receiving information of a vehicle to which the filling nozzle 50 is inserted such as tank pressure, tank temperature, tank capacity and the like to transmit the vehicle information via a short-distance radio communication to the controller 20. The radio transmission section 10 has a sealing structure and an explosion-proof structure, and the controller 20 has an explosion-proof structure also. In addition, infrared ray communication is used as a radio communication system.

The controller 20 is mounted in the filling apparatus 100, and has a radio receiving section 30 such as a converter, and a CPU board 40. The vehicle information transmitted from the radio transmission section 10 is converted by the radio receiving section 30, and the converted information is transmitted to the CPU board 40 via serial communication or the like. When hydrogen is filled, the CPU board 40 processes the information transmitted from the radio transmission section 10 to control devices not shown of the filling apparatus 100.

In FIG. 3, the radio transmission section 10 has an infrared ray receiving block 11, a signal converting block 12, an information processor 13 such as a microcomputer, a radio signal converting block 14, and a battery 15. When the filling nozzle 50 (refer to FIGS. 1 and 2) is attached to a hydrogen filling port of a vehicle not shown, the vehicle information described above is transmitted via a vehicle information communicating system not shown mounted in the vehicle, and the infrared ray receiving block 11 receives the vehicle information. The received information is transmitted via the signal converting block 12 to the information processor 13. The vehicle information is processed by the information processor 13, and is transmitted via the radio signal converting block 14 to the controller 20 through radio communication. The radio transmission section 10 is operated by the battery 15.

In FIG. 3, the controller 20 is mounted in the filling apparatus 100, and the radio receiving section 30 of the controller 20 has a radio signal converting block 31, an information processer 32, a signal transmitting block 33 and a power source part 34. The vehicle information transmitted from the radio transmission section 10 is received in the radio signal converting block 31 of the radio receiving section 30, and is processed in the information processer 32, and is transmitted via the signal transmitting block 33 to the CPU board 40 in serial communication for instance. To the power source part 34 is supplied DC power from the CPU board 40.

As shown in FIGS. 1 to 3, this embodiment does not use the conventional cable 204 shown in FIG. 10, but adopts radio communication, which provides no problem caused by cables.

In case that the radio transmission section 10 is always driven by the buttery 15, there is a possibility that sunlight shines on the radio transmission section 10 to generate a noise such as bias signal, and the noise is transmitted to the controller 20 of the hydrogen filling apparatus 100. In this connection, the first embodiment removes the noise by the information processer 13 mounted on the radio transmission section 10.

In FIG. 4, the information processer 13 of the radio transmission section 10 has a vehicle information checking block 16 and a buttery residual capacity signal generating block 19, and the vehicle information checking block 16 has a judgement block 17 and a noise removing block 18. In addition, arrows connecting the blocks indicate signal communicating lines. The judgement block 17 of the vehicle information checking block 16 has a function of judging that the signal transmitted from the signal converting block 12 is that relative to the vehicle information communicated via a communicating system in the vehicle, or noise due to sunshine with known technologies. The noise removing block 18 has a function of removing a signal judged as noise by the judgement block 17 with known technologies.

When the vehicle information is transmitted from the radio transmission section 10 to the controller 20 (refer to FIGS. 1 and 3), only signal that is not judged as the noise by the judgement block 17 is transmitted via the radio signal converting block 14 to the controller 20. Then, the signal judged as noise by the judgement block 17 is removed by the noise removing block 18 and is not transmitted to the controller 20. As a result, it is prevented that the noise due to sunshine is transmitted to the controller 20. In FIG. 4, the buttery residual capacity signal generating block 19 has functions of determining residual capacity of the battery 15 with known technologies and generating a signal indicating that the determined buttery residual capacity to transmit it via the radio signal converting block 14 to the controller 20.

With the first embodiment described above, since the radio transmission section 10 having a function of transmitting the vehicle information via the radio communication is mounted on the filling nozzle 50, a communication cable is not needed. Then, disconnection of the cable can be avoided, and repair work of the filling apparatus 100 becomes easy when it is damaged or broken. In addition, since the vehicle information is transmitted via radio communication, there is no possibility that a noise affects the vehicle information.

In addition, the radio transmission section 10 is detachably attached to an end portion of the filling nozzle 50, so that when being damaged the radio transmission section 10 can be detached from the filling nozzle 50 to be repaired easily and certainly. Further, the radio transmission section 10 has an explosion-proof structure, so that safety of the filling apparatus 100 can be maintained. In addition, the radio transmission section 10 incorporates the buttery 15, so that operation of the filling apparatus 100 can be secured without cables.

Further, since the radio transmission section 10 has the information processer 13, and a noise generated from the radio transmission section 10 is removed by the vehicle information checking block 16 including the judgement block 17 and the noise removing block 18, it is prevented that the noise is transported to the controller 20 of the filling apparatus 100. Therefore, the controller 20 is not required to process the noise, and load on the controller 20 can be decreased. In addition, residual capacity of the buttery 15 for driving the radio transmission section 10 is managed by the controller 20, so that necessary measures can be taken immediately when the residual capacity decreases.

Next, a filling apparatus according to the second embodiment of the present invention will be explained with reference to FIG. 5. The present embodiment has a mode for processing the noise in the radio transmission section 10 that is different from that in the first embodiment (refer to FIG. 4). In FIG. 5, the radio transmission section 10 is detachably attached to an end portion of the filling nozzle 50, and has a radio transmission section driving block 21. On the filling nozzle 50 is mounted an automatic switch 51, and the automatic switch 51 and the radio transmission section driving block 21 are connected with each other via a signal communication line SL.

The automatic switch 51 has a function of transmitting an operation signal via the signal communication line SL to the radio transmission section driving block 21 when the filling nozzle 50 is attached to the filling port of the vehicle, and has a function of transmitting a stop signal via the signal communication line SL to the radio transmission section driving block 21 when the filling nozzle 50 is detached therefrom. The radio transmission section driving block 21 of the radio transmission section 10 has a function of operating the radio transmission section 10 when the operation signal is received from the automatic switch 51, and has a function of stopping operation of the radio transmission section 10 when the operation stop signal is received from the automatic switch 51. In the second embodiment shown in FIG. 5, unless the filling nozzle 50 is attached to the filling port of the vehicle and the automatic switch 51 turns ON, the radio transmission section driving block 21 does not operate the radio transmission section 10. Therefore, if a noise generates because sunlight irradiates the radio transmission section 10, the radio transmission section 10 does not operate, so that the noise is not transmitted to the controller 20 of the filling apparatus 100.

With the second embodiment, the radio transmission section 10 does not operate at unfilling state, so that generated noise is not transmitted to the controller 20, and load thereof can be decreased. Other constructions and action effects of the second embodiment are the same as those of the first embodiment described above.

Next, a filling apparatus according to the third embodiment of the present invention will be explained with reference to FIGS. 6 and 7. The filling apparatus according to the present embodiment has a radio transmission section 30C and a mode for processing noise that are different from those in the first and second embodiments. In FIG. 6, an information processer 32C constituting the radio receiving section 30C has a nozzle signal block 35, a clocking block 36, a determination block 37 and a control block 38C. In addition, arrows connecting the blocks indicate signal communicating lines.

Although not clearly shown in FIG. 6, when the filling nozzle is detached from a nozzle hook, an ON signal generates from a nozzle switch, and when the filling nozzle is hooked on the nozzle hook, an OFF signal generates from the nozzle switch. The nozzle signal block 35 in FIG. 6 has functions of receiving the nozzle switch ON/OFF signals via a radio signal converting block 31C and transmitting the signals to the determination block 37. In addition, the nozzle signal block 35 has a function of transmitting a clocking start signal to the clocking block 36 when the nozzle switch ON signal is received from the nozzle switch.

When receiving the clocking start signal from the nozzle signal block 35, the clocking block 36 counts time elapsed after the reception of the clocking start signal. Then, the clocking block 36 has a function of transmitting a predetermined time passage signal indicating that a predetermined time passes to the determination block 37. Here, the predetermined time is a time until the filling actually starts after the filling nozzle is detached from the nozzle hook, and the time is properly determined in accordance with kind of fuel and the like. The determination block 37 has functions of judging that the filling is being actually performed when the nozzle switch ON signal from the nozzle signal block 35 and the predetermined time passage signal from the clocking block 36 are received, and transmitting an operation signal to the control block 38C. When receiving the operation signal, the control block 38C receives various signals such as signals indicating the vehicle information transmitted from the radio transmission section 10 via the radio signal converting block 31C.

When receiving the operation signal from the determination block 37, the control block 38C operates, and the various signals transmitted from the radio transmission section 10 are processed in the control block 38C to be transmitted via the signal transmitting block 33C to the CPU board 40. The CPU board 40 processes the various signals to transmit predetermined control signals to devices of the filling apparatus 100. On the other hand, the control block 38C does not operate until the operation signal is received from the determination block 37. In other words, the control block 38C does not operate until the predetermined time passes after the nozzle switch turns ON. In case that the nozzle switch OFF signal is transmitted from the nozzle signal block 35 to the determination block 37, the determination block 37 judges that the filling is not performed to stop transmitting the operation signal to the control block 38C. As a result, the control block 38C does not operate.

Until the control block 38C operates, the various signals transmitted from the radio transmission section 10 are not transmitted to the CPU board 40 to be processed thereby. Until the predetermined time passes after the nozzle switch turns ON, the control block 38 does not operate, and the CPU board 40 does not process the signals from the radio transmission section 10. Therefore, if noise generates, the noise is not transmitted to the CPU board 40. And, load of the CPU board 40 is decreased. Meanwhile, in the third embodiment, the clocking block 36 may transmit time elapsed after the clocking starts only to the determination block 37, and the determination block 37 may judge whether the predetermined time passes or not.

Control in the third embodiment will be explained with reference to FIG. 7 mainly. In FIG. 7, in Step S1, the nozzle signal block 35 of the information processer 32C (refer to FIG. 6) judges whether an ON signal is received from the nozzle switch or not. In case that the ON signal is received therefrom (Step S1; Yes), the control advances to Step S2. On the other hand, in Step S1, in case that the nozzle signal block 35 judges that the ON signal is not received (Step S1; No), the control advances to Step 3.

In Step S2, the clocking block 36 counts the time elapsed after the ON signal is received. And, the control advances to Step S4. In Step S3, the determination block 37 does not receive the ON signal from the nozzle signal block 35, and the control block 38C does not operate. After Step S3 is finished, the control returns to Step S1.

In Step S4, the control judges whether the predetermined time passes after the clocking starts in Step S2 or not. In case that the predetermined time passes after the clocking starts (Step S4; Yes), the control advances to Step S5. On the other hand, in case that the predetermined time does not pass after the clocking starts (Step S4; No), the control returns to Step S4.

In Step S5, filling control is carried out. In the control, the CPU board 40 processes the various signals, and transmits a predetermined control signal to devices of the filling apparatus 100. In Step S5, the control block 38C of the information processer 32C operates and various signals are transmitted to the CPU board 40. In Step S6, the determination block 37 judges whether an OFF signal is received from the nozzle switch or not. In case that the OFF signal is received therefrom (Step S6; Yes), the control advances to Step S7. On the other hand, in case that the OFF signal is not received from the nozzle switch (Step S6; No), the control returns to Step S5.

In Step S7, a filling completion control is performed based on a predetermined protocol. With this, the control block 38C of the information processer 32C does not operate, and the CPU board 40 does not process the various signals transmitted from the radio transmission section 10.

With the third embodiment described above, the CPU board 40 does not process the noise generated at unfilling state, so that load thereof can be decreased. In addition, in the present embodiment, Step S4 in FIG. 7 can be omitted, and a filling control base on Step 1 only can be performed. Other constructions and action effects thereof in the third embodiment are the same as those in the first and second embodiments.

Next, a filling apparatus according to the fourth embodiment of the present invention will be explained with reference to FIGS. 8 and 9. In comparison to the first to third embodiments, constructions of a radio receiving section and a filling nozzle and mode for processing noise of this embodiment are different from those of the first to third embodiments. An information processer 32D configuring the radio receiving section 30D has a filling start/end signal block 39 and a control block 38D. In addition, arrows connecting the blocks indicate signal communicating lines.

In the fourth embodiment, on the filling nozzle are mounted a filling start button and a filling end button. The filling start/end signal block 39 receives a filling start signal transmitted when the filling start button is pressed and a filling end signal when the filling end button is pressed via a radio signal converting block 31D. The filling start/end signal block 39 has functions of transmitting an operation signal to a control block 38D when the filling start signal is received, and transmitting a non-operation signal to the control block 38D when the filling end signal is received. The control block 38D receives the operation/non-operation signals from the filling start/end signal block 39, and receives the various signals transmitted form the radio transmission sections 10 via a radio signal converting block 31D.

The control block 38D operates when the operation signal is received from the filling start/end signal block 39. When the control block 38D operates, the various signals transmitted from the radio transmission sections 10 are transmitted via a signal transmission block 33D to the CPU board 40. The CPU board 40 processes the various signals, and transmits a predetermined control signal to devices of the filling apparatus 100. On the other hand, the control block 38D does not operate until the operation signal is received from the filling start/end signal block 39 or until the hydrogen filling is started. In addition, the control block 38D stops when the non-operation signal is received from the filling start/end signal block 39. In case that the control block 38D does not operate, the various signals transmitted from the radio transmission section 10 are not transmitted to the CPU board 40, and the CPU board 40 judges that filling is not performed, and does not process the various signals. Even when the radio receiving section 30D receives a signal from the radio transmission sections 10, the CPU board 40 does not process the signal, so that load of the CPU board 40 is decreased.

Control in the fourth embodiment will be explained with reference to FIG. 9 mainly. In FIG. 9, in Step S11, the filling start/end signal block 39 judges whether the filling start signal is received or not. In case that the filling start signal is received (Step S11; Yes), the control advances to Step S12. On the other hand, in case that the filling start signal is not received (Step S11; No), the control advances to Step 13.

In Step S12, the filling start signal is received, so that the control block 38D of the information processer 32D operates, and the various signals are transmitted to the CPU board 40. Therefore, a filling control is performed in Step S12. At the filling control, the CPU board 40 processes the various signals, and transmits a predetermined signal to devices of the filling apparatus 100. After the Step S12, the control advances to Step S14. In Step S13, the filling start signal is not received, so that the control block 38D does not operate, and the CPU board 40 does not process the various signals transmitted from the radio transmission sections 10. After Step S13, the control returns to Step S11.

In Step S14, the filling start/end signal block 39 judges whether the filling end signal is received or not. As described above, for example, when the filling is finished, pressing the filling start button again causes the filling end signal to be transmitted via the radio transmission sections 10 to the radio receiving section 30D. In case that the filling end signal is received (Step S14; Yes), the control advance to Step S15. On the other hand, the filling end signal is not received (Step S14; No), the control returns to Step 12, and the filling control is continued.

In Step S15, the filling end signal is received to perform a filling end control. The filling end control is performed based on a predetermined protocol. When the filling end control is performed, the control block 38D does not operate, and the CPU board 40 does not process the various signals transmitted from the radio transmission sections 10. The control returns to Step S11.

With the fourth embodiment described above, until the filling start button is pressed, the control block 38D judges that the filling is not performed and does not operate, and the CPU board 40 does not process the various signals transmitted from the radio transmission sections 10. Therefore, when noise generates at unfilling state, the noise is not processed in the CPU board 40, and load of the controller 20 is decreased. In addition, other constructions and action effects thereof in the fourth embodiment are the same as those in the embodiments shown in FIGS. 1 to 7.

Since the embodiments shown in the drawings are merely examples, and the embodiments do not limit the technical scope of the present invention. For example, the present invention can be applied to a filling apparatus for filling gasoline or other fuels.

DESCRIPTION OF THE REFERENCE NUMERALS 10 radio transmission section
13 information processor
15 buttery
20 controller
40 CPU board
50 filling nozzle
51 automatic switch
100 filling apparatus

What is claimed is:

1. A filling apparatus comprising a radio transmission section capable of transmitting vehicle information via radio transmission on a filling nozzle, the radio transmission section including an information processor operative to detect noise and filter the detected noise from transmissions made by the radio transmission section.

2. The filling apparatus as claimed in claim 1, wherein the radio transmission section is configured to be detachably mounted to an end portion of the filling nozzle.

3. The filling apparatus as claimed in claim 1, wherein the radio transmission section has an explosion-proof structure.

4. The filling apparatus as claimed in claim 1, wherein the radio transmission section incorporates a battery.

5. The filling apparatus as claimed in claim 4, wherein the information processor is capable of checking the vehicle information and transmitting residual capacity of the battery.

6. The filling apparatus as claimed in claim 2, wherein the radio transmission section has an explosion-proof structure.

7. The filling apparatus as claimed in claim 2, wherein the radio transmission section incorporates a battery.

8. The filling apparatus as claimed in claim 7, wherein the radio transmission section incorporates an information processor, and the information processor has functions of checking the vehicle information and transmitting residual capacity of the battery.

9. The filling apparatus as claimed in claim 3, wherein the radio transmission section incorporates a battery.

10. The filling apparatus as claimed in claim 9, wherein the radio transmission section incorporates an information processor, and the information processor has functions of checking the vehicle information and transmitting residual capacity of the battery.

11. The filling apparatus as claimed in claim 1, wherein the information processor is operative to detect and filter noise associated with sunlight.

12. The filling apparatus as claimed in claim 1, wherein the radio transmission section includes an annular body configured to slide over a portion of the filling nozzle.

* * * * *